(12) United States Patent
Pontén

(10) Patent No.: US 9,275,275 B2
(45) Date of Patent: Mar. 1, 2016

(54) OBJECT TRACKING IN A VIDEO STREAM

(71) Applicant: CRUNCHFISH AB, Malmö (SE)

(72) Inventor: Fredrik Pontén, Dalby (SE)

(73) Assignee: CRUNCHFISH AB, Malmo (SE)

( * ) Notice: Subject to any disclaimer, the term of this patent is extended or adjusted under 35 U.S.C. 154(b) by 0 days.

(21) Appl. No.: 14/419,169

(22) PCT Filed: Mar. 14, 2013

(86) PCT No.: PCT/SE2013/050240
§ 371 (c)(1),
(2) Date: Feb. 2, 2015

(87) PCT Pub. No.: WO2014/021755
PCT Pub. Date: Feb. 6, 2014

(65) Prior Publication Data
US 2015/0206002 A1    Jul. 23, 2015

Related U.S. Application Data

(60) Provisional application No. 61/679,510, filed on Aug. 3, 2012.

(30) Foreign Application Priority Data

Aug. 3, 2012   (SE) ...................................... 1250910

(51) Int. Cl.
*G06K 9/00*     (2006.01)
*G06T 7/20*     (2006.01)
*G06F 3/033*    (2013.01)

(52) U.S. Cl.
CPC .......... *G06K 9/00355* (2013.01); *G06T 7/2033* (2013.01); *G06T 2207/10016* (2013.01); *G06T 2207/10024* (2013.01); *G06T 2207/30196* (2013.01)

(58) Field of Classification Search
USPC ......... 382/100, 103, 106–107, 116, 123, 128, 382/162, 168, 173, 181, 199, 203, 209, 219, 382/232, 254, 274, 276, 286–291, 305, 382/312; 345/173, 158
See application file for complete search history.

(56) References Cited

U.S. PATENT DOCUMENTS

2002/0015024 A1\* 2/2002 Westerman ........... G06F 3/0235
345/173
2010/0027845 A1\* 2/2010 Kim ..................... G06K 9/6296
382/107

(Continued)

FOREIGN PATENT DOCUMENTS

EP       2 428 870 A1    3/2012
GB       2474536 A       4/2011

(Continued)

OTHER PUBLICATIONS

Antonis A. Argyros et al., "Vision-Based Interpretation of Hand Gestures for Remote Control of a Computer Mouse", Institute of Computer Science, 2006.

*Primary Examiner* — Seyed Azarian
(74) *Attorney, Agent, or Firm* — Birch, Stewart, Kolasch & Birch, LLP

(57) ABSTRACT

A computing device for tracking an object in an image stream, said computing device comprising a memory and a controller, wherein said controller is configured to: receive an image stream comprising at least a first and a previous image of an object to be tracked, determine contour lines in at least said first image, wherein said contour lines comprises a plurality of points, determine and assign at least one descriptor to each point, filter out points based on the descriptors, determine relative distances between each point in said first picture with each point in said previous picture, which points have not been filtered out; and determine a maximum occurrence for the relative distances, wherein the maximum occurrence corresponds to a movement of said object to be tracked in the plane. A movement in a direction parallel to the line of sight is determined from an average position, a relative distance and slopes of linear fittings for each point-component of the points in the two images.

18 Claims, 11 Drawing Sheets

(56) References Cited

U.S. PATENT DOCUMENTS

| | | | | |
|---|---|---|---|---|
| 2011/0074675 A1* | 3/2011 | Shiming | ............ | G06K 9/00362 345/158 |
| 2011/0299737 A1* | 12/2011 | Wang | ...................... | G06F 3/017 382/107 |
| 2012/0086863 A1 | 4/2012 | Williams et al. | | |
| 2013/0163837 A1* | 6/2013 | Zabair | ...................... | G06K 9/00 382/128 |

FOREIGN PATENT DOCUMENTS

| | | |
|---|---|---|
| GB | 2483168 A | 2/2012 |
| WO | WO 2009/128064 A2 | 10/2009 |
| WO | WO 2011/045789 A1 | 4/2011 |

* cited by examiner

OBJECT TRACKING IN A VIDEO STREAM

CROSS REFERENCE TO RELATED APPLICATIONS

This application is the National. Phase of PCT International Application No. PCT/SE2013/050240, filed on Mar. 14, 2013, which claims priority under 35 U.S.C. 119(e) to U.S. Provisional Application No. 61/679,510, filed on Aug. 3, 2012 and under 35 U.S.C. 119(a) to Patent Application No. 1250910-5, filed in Sweden on Aug. 3, 2012, all of which are hereby expressly incorporated by reference into the present application.

TECHNICAL FIELD

This application relates to a method, a computer-readable medium and a computing device for tracking an object, and in particular to a method, a computer-readable medium and a computing device for reducing a dataset for an improved tracking of an object in a video stream. This application also relates to a method, a computer-readable medium and a computing device for tracking a plurality of objects.

This application further relates to a method, a computer-readable medium and a computing device for tracking an object in a dimension parallel to a line of sight in the video stream.

BACKGROUND

Developers have been trying to successfully implement vision based control in contemporary devices such as gaming consoles, computers and smart phones. Most attempts have been unsuccessful in providing a control system that is sufficiently effective to be practical for operation under all real life scenarios. Some examples of such systems are given below.

The American patent application published as US2011299737 discloses a vision-based hand movement recognition system and method thereof are disclosed. In embodiment, a hand posture is recognized according to consecutive hand images first. If the hand posture matches a start posture, the system then separates the consecutive hand images into multiple image groups and calculates motion vectors of these image groups. The distributions of these motion vectors are compared with multiple three-dimensional motion vector histogram equalizations to determine a corresponding movement for each image group. For example, the corresponding movement can be a left moving action, a right moving action, an up moving action or a down moving action. Finally, the combination of these corresponding movements is defined as a gesture, and an instruction mapped to this gesture is then executed.

The international patent application published as WO09128064 discloses a method for man machine interaction with an electronic device associated with an electronic display comprises capturing images of at least one hand positioned over an input device, tracking position or posture of the hand from the images; switching from interaction based on interaction with an input device to pointing device emulation in response to detecting a gesture performed with the hand, and emulating a pointing device based on the tracking, with the hand no longer performing the gesture.

The British patent application published as GB2474536 discloses how a user controls an electronic device (TV, DVD player, PC, mobile phone, camera, STB) based on computer vision. Image sensor captures a sequence of images of field of view. Processor receives the sequence of images; detects movement of at least one object in the images; applies a shape recognition algorithm (such as contour detection) on the at least one moving object; confirms that the object is a user hand by combining information from at least two images of the object; and tracks the object to detect control gestures for controlling the device. Shape recognition may be applied together with or before movement detection. In a first stage, an initializing gesture, such as a wave like movement, may be detected. In poor lighting conditions a user hand may be identified based mainly on movement detection. User hand gestures may control cursor movement and operation, select and manipulate objects (e.g. icons), or provide button click emulation, e.g. mouse click commands. Image sensor may be a 2D camera such as a webcam or a 3D camera and may be integrated with or external to device or IR sensitive.

The tracking provided by such systems are simply too slow to be effective or they require specially adapted cameras. One major disadvantage is that they require good light conditions to operate and high resolution pictures which make them unsuitable for use in poor or adverse light conditions. They are also unsuitable for use at distances larger than 3 meters.

Another major disadvantage is the complexity of the calculations involved in the prior art systems which require vast computational resources. As such resources are costly the prior art systems are not suited for implementation in devices such as smart phones, internet tablets, laptops or gaming consoles.

There is thus a need for a manner of tracking an object in a video stream that is able to operate under low light conditions and at distances greater than 3 meters. There is also a need for a manner of tracking objects that does not require specially adapted equipment and can be used in any computational device. Furthermore there is a great need for a manner of tracking an object in an image stream that does not require vast computational resources.

Contemporary devices that are used for tracking objects in a direction parallel to the line of sight, that is, for tracking objects moving away and towards a camera all require specialized equipment such as stereo cameras or range cameras. Such specialized equipment is expensive and there thus exist a need to provide a low-cost alternative to such specialized camera equipment.

SUMMARY

It is an object of the teachings of this application to overcome the problems listed above by providing a computing device for tracking an object in an image stream, said computing device comprising a memory and a controller, wherein said controller is configured to: receive an image stream comprising at least a first and a previous image of an object to be tracked, determine contour lines in at least said first image, wherein said contour lines comprises a plurality of points, determine and assign at least one descriptor to each point, filter out points based on the descriptors, determine relative distances between each point in said first picture with each point in said previous picture, which points have not been filtered out; and determine a maximum occurrence for the relative distances, wherein the maximum occurrence corresponds to a movement of said object to be tracked.

Such a computing device does not require substantial computational resources due to the clever manner that the data set of the points is reduced. Through this a manner of tracking an object is provided which can be utilized in computational devices that do not have any special equipment and which does not have vast computational resources required by the prior art systems for operating efficiently.

In one embodiment the controller is further configured to filter out points by filtering out points having descriptors that are non-descript. This allows the tracking to focus on points that are possible or easy to track thereby reducing the workload and the number of calculations that need to be performed thereby reducing the computational resources required for an effective implementation.

In one embodiment the controller is further configured to filter out points by filtering out points exhibiting a large movement, by comparing the descriptors of said first image with corresponding descriptors for points of said previous image. This allows the tracking to disregard points that are possibly false movements resulting from noise thereby reducing the workload and the number of calculations that need to be performed thereby reducing the computational resources required for an effective implementation.

In one embodiment the controller is further configured to filter out points belonging to stationary contour lines. This reduces the dataset to be processed by removing all stationary objects including the background and other non-moving objects.

In one embodiment the controller is further configured to filter out points that are unlikely to be part of the object to be tracked. This allows the tracking to focus on the points that are actually or likely part of the object to be tracked, thereby reducing the dataset to be processed.

It is also an object of the teachings of this application to overcome the problems listed above by providing a method for use in a computing device for tracking an object in an image stream, said method comprising: receiving an image stream comprising at least a first and a previous image of an object to be tracked, determining contour lines in at least said first image, wherein said contour lines comprises a plurality of points, determining and assign at least one descriptor to each point, filtering out points based on the descriptors, determining relative distances between each point in said first picture with each point in said previous picture, which points have not been filtered out, and determining a maximum occurrence for the relative distances, wherein the maximum occurrence corresponds to a movement of said object to be tracked.

It is a further object of the teachings of this application to overcome the problems listed above by providing a computer readable medium comprising instructions that when loaded into and executed by a controller, such as a processor, cause the execution of a method according to herein.

The inventors of the present invention have realized, after inventive and insightful reasoning, that through clever filtering the data set to be processed can be reduced to a size where the computational resources required are small enough to be operational even in portable devices and under poor lighting conditions.

The teachings herein find use in control systems for computational devices having user interfaces such as smart phones, interne tablets, computers and gaming consoles.

According to a second aspect of the teachings herein, it is also an object of the teachings of this application to overcome the problems listed above by providing a computing device for tracking an object in an image stream, said computing device comprising a memory and a controller, wherein said controller is configured to: receive a dataset comprising at least one point pair comprising a point in a first picture and a point in a previous picture, determine a mean position of each point pair, determine a relative distance for each point pair and determine a slope of a corresponding linear fitting of said relative distances versus said mean positions, and determine a movement in a direction parallel with a line of sight based on the slope. Such a computational device is able to determine a movement in a third dimension without requiring the use of special cameras such as depth cameras or stereo cameras.

It is also an object of the teachings of this application to overcome the problems listed above by providing a method for use in a computing device for tracking an object in an image stream, said method comprising: receiving a dataset comprising at least one point pair comprising a point in a first picture and a point in a previous picture, determining a mean position of each point pair, determining a relative distance for each point pair and determine a slope of a corresponding linear fitting of said relative distances versus said mean positions, and determining a movement in a direction parallel with a line of sight based on the slope.

It is a further object of the teachings of this application to overcome the problems listed above by providing a computer readable medium comprising instructions that when loaded into and executed by a controller, such as a processor, cause the execution of a method according to herein.

The inventors of the present invention have realized, after inventive and insightful reasoning, that by utilizing the correlation between a change in distance to a focal point and the distance to the focal point it is possible to determine movement in a direction parallel to a line of sight without requiring specialized equipment and can be used with any computational device being adapted to receive a video stream, for example from an internal camera.

The teachings herein find use in control systems for computational devices having user interfaces such as smart phones, interne tablets, computers and gaming consoles.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein.

All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings in which:

FIG. 16 shows a flowchart illustrating a general method for tracking an object according to an embodiment of the teachings herein;

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figures 1A, 1B:
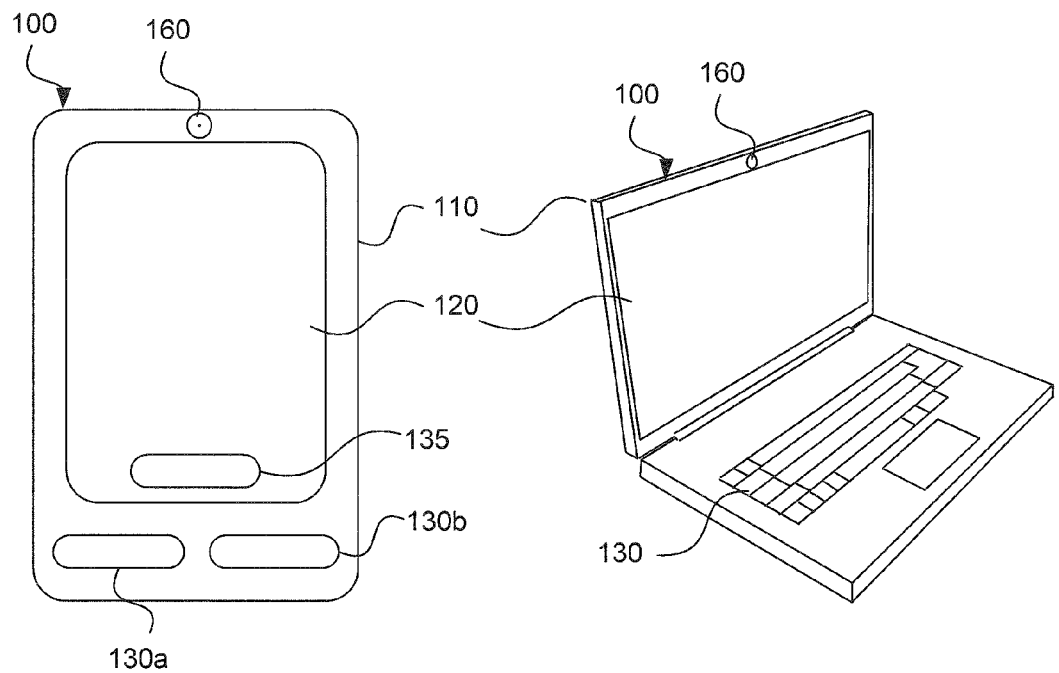
FIGS. 1A and 1B are schematic views of each a computing device according to the teachings herein.

FIG. 1 generally shows a computing device 100 according to an embodiment herein. In one embodiment the computing device 100 is configured for network communication, either wireless or wired. Examples of such a computing device 100 are: a personal computer, desktop or laptop, an internet tablet, a mobile communications terminal such as a mobile telephone, a smart phone, a personal digital assistant and a game console. Two embodiments will be exemplified and described as being a smartphone in FIG. 1A and a laptop computer 100 in FIG. 1B.

Referring to FIG. 1A a mobile communications terminal in the form of a smartphone 100 comprises a housing 110 in which a display 120 is arranged. In one embodiment the display 120 is a touch display. In other embodiments the display 120 is a non-touch display. Furthermore, the smartphone 100 comprises two keys 130a, 130b. In this embodiment there are two keys 130, but any number of keys is possible and depends on the design of the smartphone 100. In one embodiment the smartphone 100 is configured to display and operate a virtual key 135 on the touch display 120. It should be noted that the number of virtual keys 135 are dependant on the design of the smartphone 100 and an application that is executed on the smartphone 100. The smartphone 100 is also equipped with a camera 160. The camera 160 is a digital camera that is arranged to take video or still photographs by recording images on an electronic image sensor (not shown). In one embodiment the camera 160 is an external camera. In one embodiment the camera is alternatively replaced by a source providing an image stream.

Referring to FIG. 1B a laptop computer 100 comprises a display 120 and a housing 110. The housing comprises a controller or CPU (not shown) and one or more computer-readable storage mediums (not shown), such as storage units and internal memory. Examples of storage units are disk drives or hard drives. The computing device 100 further comprises at least one data port. Data ports can be wired and/or wireless. Examples of data ports are USB (Universal Serial Bus) ports, Ethernet ports or WiFi (according to IEEE standard 802.11) ports. Data ports are configured to enable a computing device 100 to connect with other computing devices or a server.

The laptop computer 100 further comprises at least one input unit such as a keyboard 130. Other examples of input units are computer mouse, touch pads, touch screens or joysticks to name a few.

The laptop computer 100 is further equipped with a camera 160. The camera 160 is a digital camera that is arranged to take video or still photographs by recording images on an electronic image sensor (not shown). In one embodiment the camera 160 is an external camera. In one embodiment the camera is alternatively replaced by a source providing an image stream.

Figure 2:
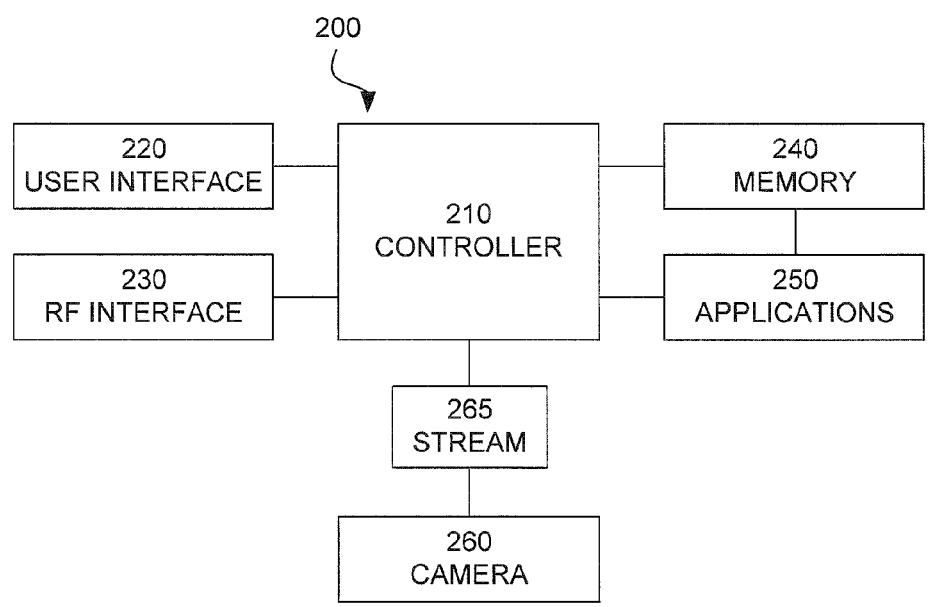
FIG. 2 is a schematic view of the components of a computing device according to the teachings herein.

FIG. 2 shows a schematic view of the general structure of a computing device according to FIG. 1. The computing device 100 comprises a controller 210 which is responsible for the overall operation of the computing device 200 and is preferably implemented by any commercially available CPU ("Central Processing Unit"), DSP ("Digital Signal Processor") or any other electronic programmable logic device. The controller 210 may be implemented using instructions that enable hardware functionality, for example, by using executable computer program instructions in a general-purpose or special-purpose processor that may be stored on a computer readable storage medium (disk, memory etc) 240 to be executed by such a processor. The controller 210 is configured to read instructions from the memory 240 and execute these instructions to control the operation of the computing device 100. The memory 240 may be implemented using any commonly known technology for computer-readable memories such as ROM, RAM, SRAM, DRAM, CMOS, FLASH, DDR, SDRAM or some other memory technology. The memory 240 is used for various purposes by the controller 210, one of them being for storing application data and program instructions 250 for various software modules in the computing device 200. The software modules include a real-time operating system, drivers for a user interface 220, an application handler as well as various applications 250. The applications are sets of instructions that when executed by the controller 210 control the operation of the computing device 200. The applications 250 can include a messaging application such as electronic mail, a browsing application, a media player application, as well as various other applications 250, such as applications for voice calling, video calling, document reading and/or document editing, an instant messaging application, a calendar application, a control panel application, one or more video games, a notepad application, voice call applications, Short Message Service applications, location finding applications.

The computing device 200 further comprises a user interface 220, which in the computing device of FIGS. 1A and 1B is comprised of the display 120 and the keys 130, 135.

The computing device 200 further comprises a radio frequency interface 230, which is adapted to allow the computing device to communicate with other devices through a radio frequency band through the use of different radio frequency technologies. Examples of such technologies are IEEE 802.11, IEEE 802.11s, and Bluetooth®. Other examples of radio technologies that may be implemented in a computing device 100 are W-CDMA, GSM, UTRAN, LTE, and NMT to name a few.

The computing device 200 is further equipped with a camera 260. The camera 260 is a digital camera that is arranged to take video or still photographs by recording images on an electronic image sensor (not shown).

The resolution of a digital camera 260 is often limited by the image sensor (typically a CCD or CMOS sensor chip) that turns light into discrete signals. The sensor is made up of a large number of receptors that essentially count the number of photons that strike the sensor. The brighter the image is at a given point on the sensor, the larger the value that is read for that pixel. The number of resulting pixels in the image determines its "pixel count". For example, a 640×480 image would have 307,200 pixels, or approximately 307 kilopixels; a 3872×2592 image would have 10,036,224 pixels, or approximately 10 megapixels.

The camera 260 is arranged to take a digital image or picture. There are many different manners of how this can be achieved. In one manner, called single-shot, the sensor (not shown) of the camera 260 is exposed to the light passing through a camera lens (not explicitly shown). Single-shot capture systems use either one CCD (Charge-Coupled Device), or three separate image sensors (one each for the primary additive colors red, green, and blue) which are exposed to the same image via a beam splitter.

The camera 260 is preferably capable of acting as a digital video camera. Digital video cameras commonly utilize one of two different image capture formats: interlaced and deinterlaced/progressive scan. Interlaced cameras record the image in alternating sets of lines: the odd-numbered lines are scanned, and then the even-numbered lines are scanned, then the odd-numbered lines are scanned again, and so on. One set of odd or even lines is referred to as a "field", and a consecutive pairing of two fields of opposite parity is called a frame. Deinterlaced cameras records each frame as distinct, with all scan lines being captured at the same moment in time. Thus, interlaced video captures samples the scene motion twice as often as progressive video does, for the same number of frames per second. Progressive-scan camcorders generally produce a slightly sharper image. However, motion may not be as smooth as interlaced video which uses 50 or 59.94 fields per second, particularly if they employ the 24 frames per second standard of film.

The digital video camera 260 provides a digital video stream 265, also referred to as a digital video. Digital video comprises a series or stream of orthogonal bitmap digital images displayed in rapid succession at a constant rate. In the context of video these images are called frames. We measure the rate at which frames are displayed in frames per second (FPS). Since every frame is an orthogonal bitmap digital image it comprises a raster of pixels. If it has a width of W pixels and a height of H pixels we say that the frame size is W×H. Pixels have only one property, their color. The color of a pixel is represented by a fixed number of bits. The more bits the more subtle variations of colors can be reproduced. This is called the color depth (CD) of the video. An example video can have a duration (T) of 1 hour (3600 sec), a frame size of 640×480 (WxH) at a color depth of 24 bits and a frame rate of 25 fps. This example video has the following properties: pixels per frame=640*480=307,200; bits per frame=307, 200*24=7,372,800=7.37 Mbits; bit rate (BR)=7.37*25=184.25 Mbits/sec; video size (VS)=184 Mbits/sec*3600 sec=662,400 Mbits=82,800 Mbytes=82.8 Gbytes. In one embodiment the camera 260 is arranged to operate at frame rate of 8 frames per second, or any of 16, 24, 32 or higher.

The camera 260 is operably connected to the controller 210 to provide the controller with the video stream 265, i.e. the series of images captured, for further processing possibly for use in and/or according to one or several of the applications 250.

In one embodiment the camera 260 is an external camera or source of an image stream.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 3:
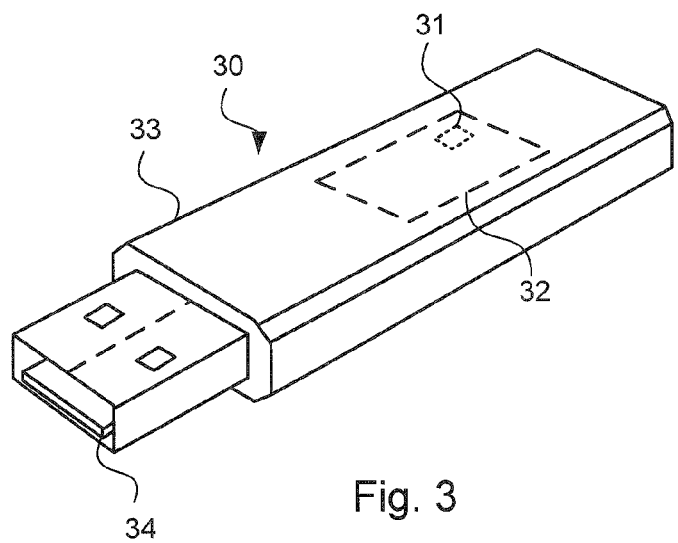
FIG. 3 is a schematic view of a computer-readable memory according to the teachings herein.

FIG. 3 shows a schematic view of a computer-readable medium as described in the above. The computer-readable medium 30 is in this embodiment a memory stick, such as a Universal Serial Bus (USB) stick. The USB stick 30 comprises a housing 33 having an interface, such as a connector 34, and a memory chip 32. The memory chip 32 is a flash memory, that is, a non-volatile data storage that can be electrically erased and re-programmed. The memory chip 32 is programmed with instructions 31 that when loaded (possibly via the interface 34) into a controller, such as a processor, executes a method or procedure according to the embodiments disclosed above. The USB stick is arranged to be connected to and read by a reading device, such as a terminal according to FIG. 1, for loading the instructions into the controller. It should be noted that a computer-readable medium can also be other mediums such as compact discs, digital video discs, hard drives or other memory technologies commonly used. The instructions can also be downloaded from the computer-readable medium via a wireless interface to be loaded into the controller.

An improved manner of tracking an object will be disclosed below with reference to the accompanying figures. The example will be illustrated focusing on the image data, but it should be clear that the processing is performed in part or fully in a computing device comprising a controller as disclosed above with reference to FIGS. 1 and 2 or caused to be performed by executing instructions stored on a computer-readable medium as disclosed with reference to FIG. 3.

Figure 4A:
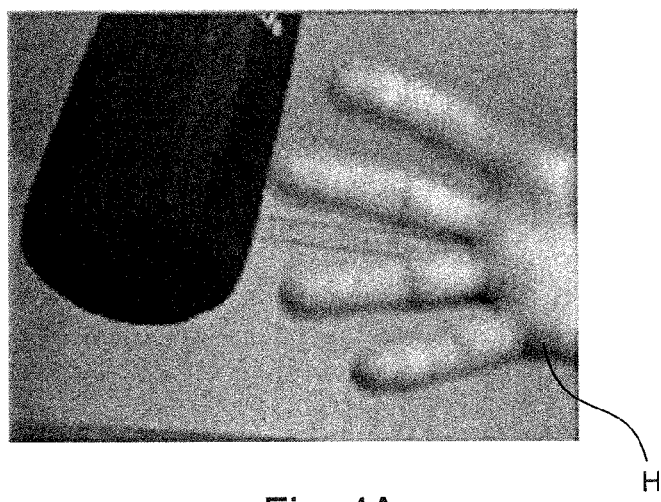
FIG. 4A shows an example image of an object to be tracked and FIGS. 4B, 4C and 4D each show a representation of a processed version of said object according to the teachings herein.

FIG. 4A shows an image of an object to be tracked, in this example a hand. The image is part of an image stream (not shown in FIG. 4, but referenced 265 in FIG. 2) provided to a controller (not shown in FIG. 4, but referenced 210 in FIG. 2) of a computing device (not shown in FIG. 4, but referenced 200 in FIG. 2) by a camera (not shown in FIG. 4, but referenced 260 in FIG. 2). The image stream can be provided to the controller (210) by an external camera or another image stream source, such as a streamed video over the internet.

To be able to perform an efficient tracking of an object it is important that the image contains enough details. The resolution of the camera is thus of importance. For objects far away from the camera the resolution becomes more important and for long distance tracking, a camera with higher resolution is preferred. For short distance tracking, a camera with a low resolution will suffice. An image resolution of 160×120 has proven to be enough to be able to successfully track an object using the manner disclosed herein.

Also, to enable accurate and precise tracking a high frame rate is preferred as this allows for a detailed tracking of an object. Such a high frame rate puts high demands on the performance of the tracking method as each tracking operation has to be completed before the next frame is received. The manner disclosed herein has proven to be able to successfully track an object using frame rates above 30 fps and as low as 8 fps.

A common image size is the Video Graphics Array (VGA) format which has 480×640 pixels, i.e. a total of 307200 pixels. Such a dataset is impractical to perform extensive calculations on and the controller is therefore configured to reduce the dataset of the image by determining contour lines in the image, thereby filtering out all points or pixels that are within an object. Such contour lines may be determined using edge detection.

Edge detection is a well-known tool in image processing, machine vision and computer vision, which aim at identifying points in a digital image at which the image brightness changes sharply or, more formally, has discontinuities. One popular method used for edge detection is the Canny edge detector which is an edge detection operator that uses a multi-stage algorithm to detect a wide range of edges in images.

Figure 4B:
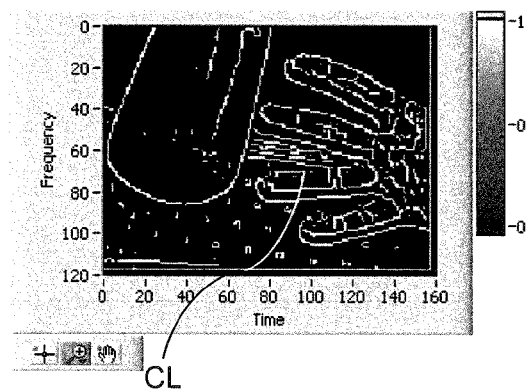

The controller is, in this example, configured to determine the contour lines using the Canny operator thereby generating Canny lines of the image or first picture (first as in currently being processed). FIG. 4B shows a view of the resulting contour lines CL for the picture in FIG. 4A. As can be seen the dataset of the image has been greatly reduced.

To improve the speed performance of the determination of contour lines the controller may be configured to utilize speed enhancement using the Canny operator. This results in a lower accuracy, but increases the processing speed. The lowered accuracy has proven to be of less consequence.

It should be noted that other means of detecting the edges for generating the contour lines exist and are part of the scope of this invention.

Figure 4C:
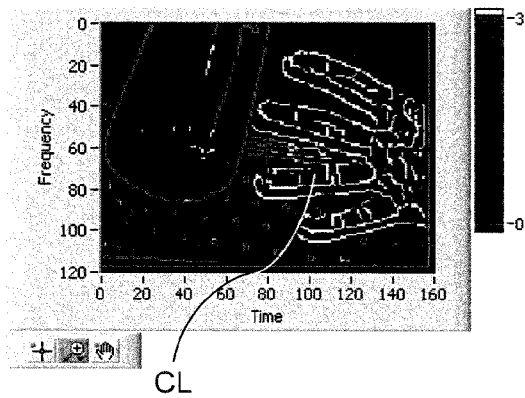

To further reduce the dataset, the controller is configured to filter out all contour lines which are stationary. The contour lines CL of the (contour) first image are compared to the contour lines of a previous image in the image stream to determine if there is an overlay or match of contour lines. Such matching contour lines represent stationary objects and are filtered out, thereby reducing the dataset of the image further. FIG. 4C shows the contour lines CL of the hand after all stationary contour lines have been filtered out.

To reduce the dataset further, the controller is configured to filter out contour lines that are unlikely to be part of the object to be tracked.

To determine that a contour line is not part of an object the properties of the contour line is compared to assumed or known properties of the object.

For example, if a rectangular object is to be traced, all circular or round contour lines are filtered out as they are unlikely part of a rectangular object. Similarly, if a rectangular object is to be traced all circular or curved lines are filtered out.

To enable filtering of certain contour lines, the controller can be configured to filter out a contour line based on a degree of the curvature for that contour line. The curvature can be can be set by the designer depending on which objects that are to be filtered. For the case of filtering for a round tracked object all contour lines having a curvature below a curvature threshold, for example below 1 or 5 or 1 to 5 degrees, are filtered out.

For the case of filtering for a rectangular tracked object all contour lines having a curvature above a curvature threshold, for example above 1 or 5 or 1 to 5 degrees, are filtered out.

The curvature can be determined based on descriptors as disclosed below or by comparing the curvature of two or more points on the contour line.

To filter rectangular objects all objects having a contour line without a corner in it may be filtered out.

To filter objects that are not part of a hand, the controller can be configured to determine that a contour line is not part of a hand by comparing the colors on both sides of the contour line. If the color on neither side of the contour line is a skin color, the contour line is not part of the hand.

The skin color to be compared with may be determined from the first images in the video stream where the object is identified and its color is determined. This allows the manner herein to be used with all skin colors and also for use with gloves or other handware or perhaps tattoos (henna or otherwise) and jewelry.

By determining a color for the object in the first few frames of tracking it allows for filtering contour lines also for other objects to be tracked.

It should be noted that the controller may be configured to filter out contour lines unlikely to be part of the object to be tracked based on a combination of criteria as listed above. For example, a hand is unlikely to contain circular contour lines and contour lines having sharp corners.

To further reduce the dataset, the controller is configured to determine which points in the image/on the contour lines that are of interest to be tracked. To identify the interesting points the controller is configured to assign descriptors to each point. The descriptors are characteristics of a point which can be used to identify the point.

Figure 4D:
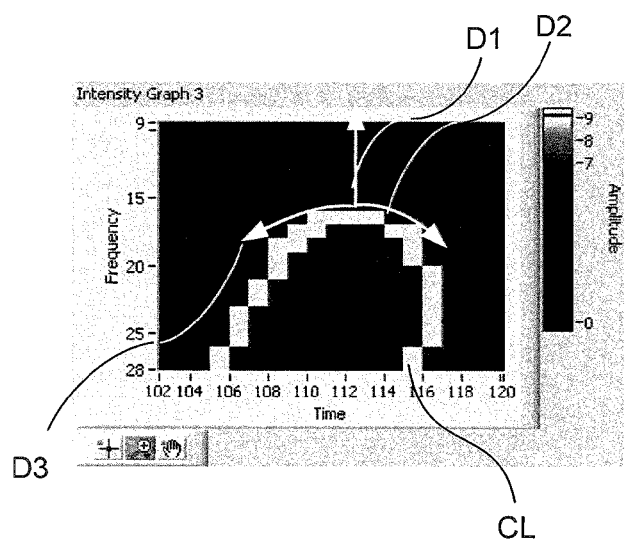

In one embodiment the controller is configured to assign three descriptors to each point. FIG. 4D shows an enlargement of a contour line image where the contour lines CL of the tip of a finger can be seen. Three descriptors D1, D2 and D3 are indicated with white arrows in FIG. 4D. The three descriptors are:

D1=angle of normal in the point;
D2=curvature to the right of the point; and
D3=curvature to the left of the point.

Optionally, the controller may be configured to additionally or alternatively assign a descriptor based on the colour of the point or the intensity of the contour line in that point. In one embodiment the controller is configured to only assign two descriptors D1 and D2 according to:

D1=angle of normal in the point and

D2=curvature in the vicinity of the point.

Assigning fewer (two) descriptors speeds up the processing, but reduces the accuracy in that the descriptors do not identify a point as clearly as when using more descriptors. The increased accuracy enables an efficient filtering which reduces the dataset to be processed.

In one embodiment, the controller is configured to determine the angle of the normal using a Sobel operator. The Sobel operator is used in image processing, particularly within edge detection algorithms. Technically, it is a discrete differentiation operator, computing an approximation of the gradient of the image intensity function. At each point in the image, the result of the Sobel operator is either the corresponding gradient vector or the norm of this vector. The Sobel operator is based on convolving the image with a small, separable, and integer valued filter in horizontal and vertical direction and is therefore relatively inexpensive in terms of computations. The Sobel operation includes a conversion from rectangular to polar coordinates. It should be noted that other means of determining the normal angle exist and are part of the scope of this invention. In one embodiment the angle for the normal are retrieved from the calculations already performed when performing the edge detection. This is beneficial in that it reduces the number of calculations that need to be performed.

Figure 5:
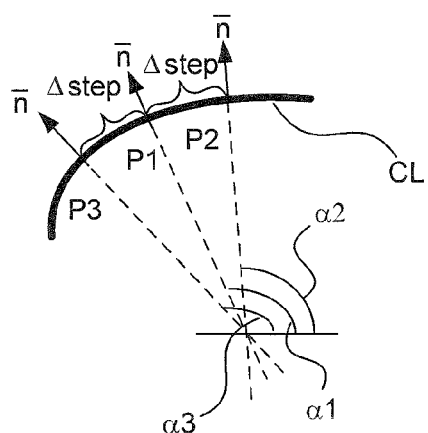
FIG. 5 shows an illustration of how descriptors can be determined according to an embodiment of the teachings herein.

FIG. 5 is an illustration of how angles $\alpha 1$, $\alpha 2$, $\alpha 3$ can be determined between points on a contour line CL. The angles $\alpha 1$, $\alpha 2$, $\alpha 3$ correspond to the normals of a point P1 and the two closest adjacent points P12 and P3 and are determined, in one embodiment, using the Sobel operator. The distance between two points is shown as $\Delta$step. According to the terminology of FIG. 5 the descriptors can be determined according to:

$$D1=\alpha 1[=Sobel(P1)];$$

$$D2=(\alpha 1-\alpha 2)/\Delta step[=(Sobel(P1)-(Sobel(P2))/\Delta step];\text{ and}$$

$$D3=(\alpha 1-\alpha 3)/\Delta step[=(Sobel(P1)-(Sobel(P3))/\Delta step].$$

This provides a simple manner of calculating or determining the descriptors and the curvature, which manner does not require complex operations, especially for the determination of the curvature as the angle(s) of the normal(s) is already determined for the adjacent points.

Using two descriptors the descriptors D1, D2 can be determined as per:

D1=$\alpha 1$ [=Sobel (P1)]; and

D2=$(\alpha 2-\alpha 3)/2\Delta step$ [=(Sobel (P2)–(Sobel (P3))/2$\Delta step$].

Figure 6:
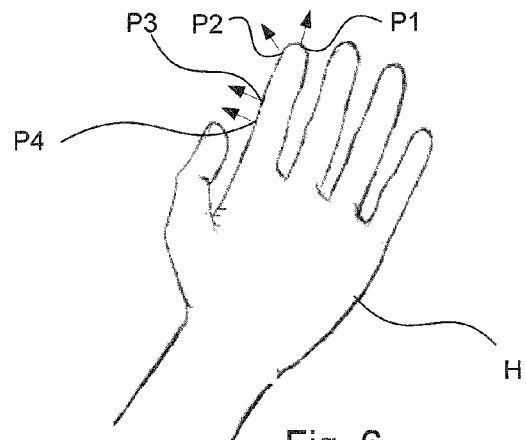
FIG. 6 shows an illustration of an object to be tracked with descriptors having been assigned according to an embodiment of the teachings herein.

To further reduce the dataset, the controller is configured to filter out points that are difficult to track. FIG. 6 shows an image of a hand where four points P1, P2, P3 and P4 have been marked with a descriptor (indicated by an arrow). Two points P3, P4 are located on the side of an index finger and two points P1, P2 are located on the tip of the index finger. The descriptors for the two side points P3, P4 are very similar, if determined according to above. This is illustrated in FIG. 6 by the corresponding descriptor arrows having the same angle. However, the descriptors for the two points on the tip of the finger P1, P2 differ both from each other and also from the descriptors for the side points P3, P4. This is illustrated in FIG. 6 by the corresponding descriptor arrows having different angles. Such points that are different to the bulk of the points in the image are easier to track and the controller is configured to filter out all points whose descriptors do not differ from the other points' descriptors.

In one embodiment the controller is configured to filter out non-descript points by counting the number of other points in the previous picture the point is compared to that have similar or equal descriptors. If the number of compared points exceeds a threshold count value, the point being compared is discarded or filtered. The threshold count may represent an absolute count, for example 100 or 500, or a relative count (a quota between the number of compared points and the total number of points), for example 1/5, 1/10, 1/20 or 1/40.

To sort out noise and to further reduce the dataset, the controller is configured to filter out points which have moved too much. The filtering is achieved by the controller comparing all points on a contour line in the image with all points on a contour line in the previous image and those point pairs that show too much difference are discarded. In one embodiment the controller is configured to retain a point pair if the changes in the descriptor $\Delta D1$, $\Delta D2$, $\Delta D3$ are below or within threshold values according to:

$\Delta D1<=T1$, for example T1=11.25 degrees;

$T2L<=\Delta D2<=T2H$, for example T2L=−50% and T2H=+100% of the descriptor value D2; and $T3L<=\Delta D3<=T3H$, for example T3L=−50% and T3H=+100% of the descriptor value D3, where T1 is a threshold value for the allowed change in descriptor D1, T2L is a lower threshold value for the allowed change in descriptor D2, T2H is a higher threshold value for the allowed change in descriptor D2, T3L is a lower threshold value for the allowed change in descriptor D3 and T3H is a higher threshold value for the allowed change in descriptor D3.

It should be noted that the smaller or more narrow the thresholds T1, T2H, T2L, T3H and T3L are, the higher the threshold count for comparing the non-descript points as discussed above.

In this embodiment the two curvature descriptors D2, D3 are allowed to vary a factor of 2. It should be noted that also other factors possible, for example 3 or 1.5.

The retained dataset has now been reduced to comprise points that are of interest.

To determine horizontal and vertical movement of an object to be tracked the controller is configured to compare all points in the dataset with all points in the dataset to determine the movement. In one embodiment the controller is compared to compare the pixel pairs that are retained according to the change in descriptors.

Figure 7:
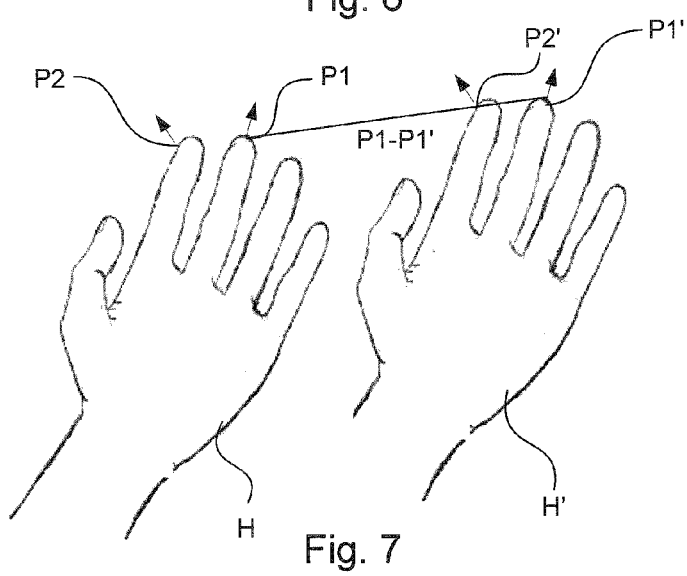
FIG. 7 shows an illustration of a moving object to be tracked with descriptors having been assigned according to an embodiment of the teachings herein.

FIG. 7 shows an illustration of how the movement comparison is performed. The figure shows two hands having each two points P1, P2 for the left hand H and P1', P2' for the right hand H'. In the example of FIG. 7 the right hand H' is the hand of the current image and the left hand H is the hand of the previous image. In FIG. 7 the hand H has moved a certain distance to the right (hand H') which is illustrated with the hands H, H' being drawn at a distance from each other. It should be noted that although FIG. 7 only shows two points P1, P2 for each hand several more points are processed in a real example.

The controller compares all points in the dataset P1, P2 of the previous image with all points of in the dataset P1', P2' the current image by calculating a distance between the each point pair. One such distance is illustrated for one point from a previous position P1 to a current position P1' and the distance is denoted P1-P1'.

Figure 8:
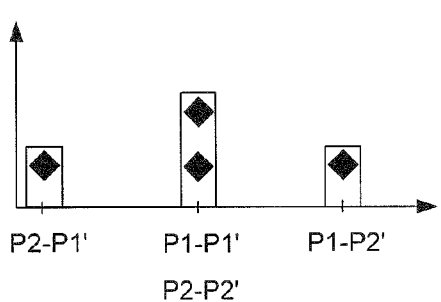
FIG. 8 shows a histogram for relative distances having been determined according to an embodiment of the teachings herein.

The distances P1-P1' are stored in a matrix for each distance. The distance is a two dimensional entity having an X (horizontal) and a Y (vertical) component and the matrix is generated so that each cell correspond to a distance given by the corresponding X and Y coordinates or components. Each cell in the matrix is incremented by one for each occurrence of a calculated distance that corresponds to that distance. FIG. 8 shows a one dimensional example for the situation illustrated in FIG. 7 where each occurrence of a distance is plotted for each distance.

As can be seen, there are four distances, whereof two are the same and represent the true movement. Those two are the distances between P1 and P1' and P2 and P2'. The other two are the distances between P1 and P2' and P2 and P1'. The true movement is determined by finding the maximum occurrence in the distance matrix. In FIG. 8 the maximum is found in the highest bar, which in this example is the bar for the two distances P1-P1' and P2-P2'.

Figure 9:
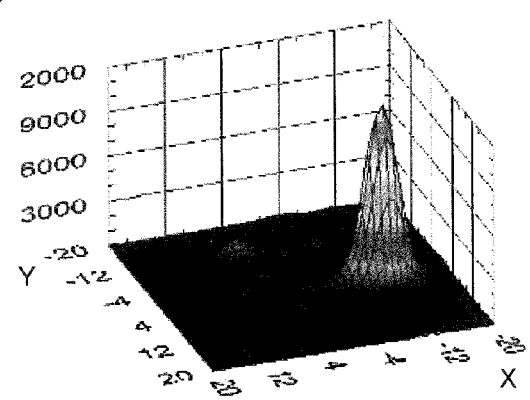
FIG. 9 shows a histogram for relative distances having been determined in an experiment according to an example embodiment of the teachings herein.

FIG. 9 shows a two dimensional representation of an experiment where an object has been tracked. As can be seen there is a peak centred around X=−12; Y=0. The maximum indicates that the object has moved 12 points or pixels in the negative X-direction.

In one embodiment the controller is configured to determine or calculate the relative distance at the same time as it is determined if a point pair exhibits too much movement, but after that it is determined that the point pair does not exhibit too much movement. This reduces the number of times the controller needs to traverse the dataset thereby improving the computational efficiency.

Using the manner disclosed above for reducing the dataset and then determining a maximum for possible movements, the true horizontal and vertical movement of an object can be determined in a manner that requires only few computational resources.

Experiments have shown that a smartphone adapted to implement the manner disclosed above is able to track objects satisfactorily using low resolution cameras and in poor light conditions (down to 20 lux), thus making the teachings herein suitable for use in mobile equipment such as smartphones, laptops, internet tablets etc as well as in stationary devices for use in less than optimum environments such as game consoles (portable as well as stationary).

The manner taught herein is suitable for tracking an object such as a hand for enabling gesture control of a device. One example implementation of the manner herein is a browsing application where a gesture of moving a hand from one side to the other indicates a "turn the page" operation in the same direction as the tracked movement. In the example of FIG. 9, the corresponding operation would be to turn to the next page (assuming that the X-direction is to the right, whereby the determined movement is a movement to the left).

The manner taught herein is also suitable for tracking an object such as an eye for enabling gaze tracking. Gaze tracking can be used to collect data pertaining to reading behaviours, determining a current point of interest on a displayed content and also for controlling a device with specified eye movements (especially useful for providing handicap support). One example implementation of the manner herein is an advertisement application where a point of interest (that is a point where the user focuses for a time exceeding a threshold value or repeatedly) is associated with a particular subject and the application is arranged to propose and display an advertisement relating to the particular subject. In the example of FIG. 9, the application would track an eye movement to the left (assuming that the X-direction is to the right, whereby the determined movement is a movement to the left).

Should no further movement be detected for a while and the viewed content contains an article on diving in a left-hand column, the application could download and display an advertisement for diving equipment.

Figure 10:
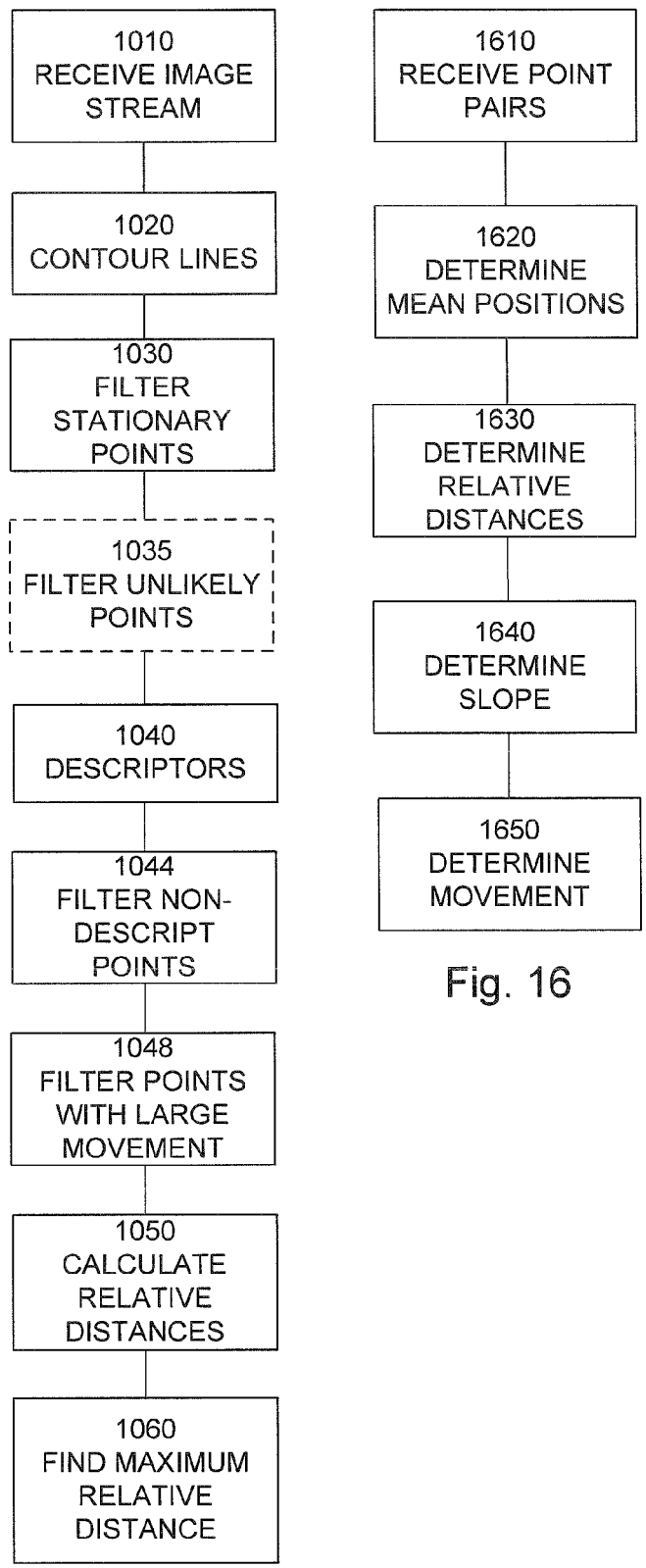
FIG. 10 shows a flowchart illustrating a general method according to an embodiment of the teachings herein.

FIG. 10 illustrates a general method according to the teachings herein. An image stream is received 1010 in a computing device. To reduce the data that is to be processed the computing device determines contour lines 1020 and filters out stationary lines 1030. Optionally (as indicated by the dashed line), the computing device filters out points that are unlikely to belong 1035 to an object to be tracked.

The computing device determines and assigns descriptors 1040 to each point. The descriptors can be used to identify points. To reduce the dataset to be processed the computing device filters out points whose descriptors indicate that the point is non-descript 1044 (difficult to differentiate from other points). To remove false movements and to reduce the dataset to be processed the computing device filters 1048 out point pairs for which the descriptors indicate that a too large movement has been made. The computing device thereafter determines the relative distance between each point pair 1050 in the data set and finds the maximum occurrence of a relative distance 1060. The maximum relative distance corresponds to the movement of the object to be tracked.

Figure 11:
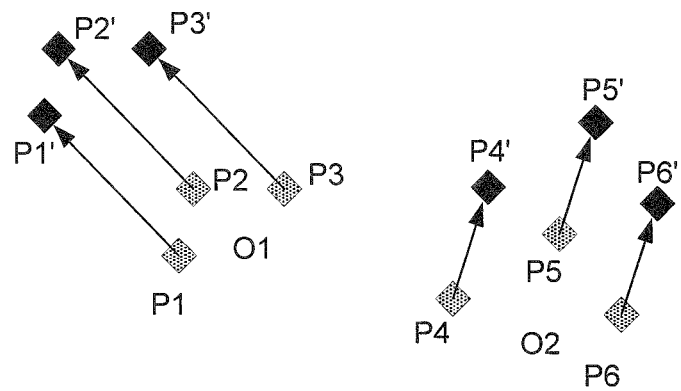
FIG. 11 shows an illustration of two moving objects to be tracked with descriptors having been assigned according to an embodiment of the teachings herein.

FIG. 11 illustrates how a plurality of objects may be tracked using the manner disclosed herein. In the schematic example illustration of FIG. 11 objects O1 and O2 are shown as being identified by each three points P1, P2 and P3 for the first object O1 and P4, P5 and P6 for the second object O2. The data set corresponding to the image has been reduced as disclosed above with reference to FIGS. 4 to 7.

Figure 12:
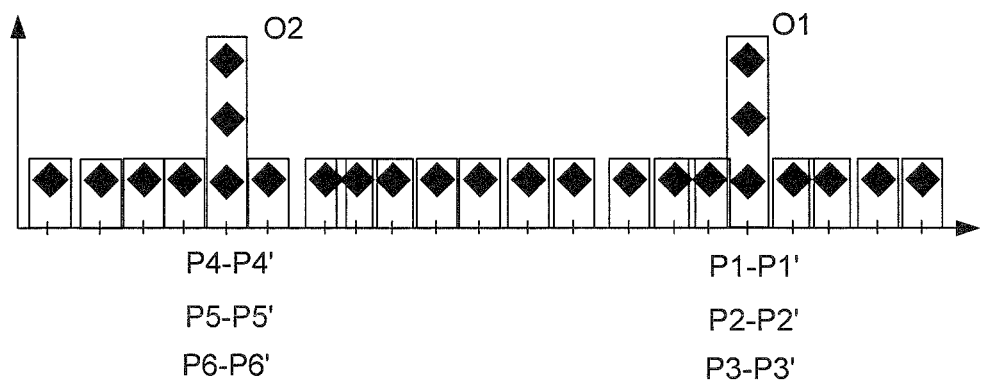
FIG. 12 shows a histogram for relative distances for two objects having been determined according to an embodiment of the teachings herein.

When the controller determines the relative distances of all point pairs for the first and second objects O1 and O2 in FIG. 11 it generates a histogram (one dimensional) as shown in FIG. 12 which shows an example histogram of relative distances for the six points P1-P6 of FIG. 11. For clarity reasons the relative distances for false movements have not been identified in the plot of FIG. 12. Also, the relative distances of FIGS. 11 and 12 are for illustrative purposes only and the correlation between the distances in FIG. 11 and the plots in FIG. 12 may not be accurate.

Two maximums can be identified in FIG. 12, one for the first object O1 and one for the second object O2. From this it can be determined that O1 has moved a certain distance and that O2 has moved another distance, where the first object O1 has moved further than the second object O2.

It is thus possible to track more than one object using the teachings herein. And, without requiring substantial additional calculations apart from the simple operation of finding a second maximum. Tracking multiple objects can beneficially be used to implement a multi-gesture control system for a device. It can also be used to provide multiple-player functionality to a video game or multiple operator input for a control system.

To enable, for example, a clicking or selection action or a zoom operation in a gesture controlled operating system it is beneficial to know the movement of an object in the depth of the image or in a dimension parallel to a line of sight in the image stream. In prior art systems the depth has been determined for example by using stereo or double cameras or using depth cameras also called ranging cameras. This poses special requirements on the camera used which increases the cost of the computing device and also limits the usability of the manner to devices equipped with such cameras or adapted to handle the extended data provided by such cameras.

The teachings herein disclose a manner below which is suitable for use with any camera and may therefore beneficially be used in smartphones, laptops, internet tablets, game consoles and other computing devices.

Figure 13:
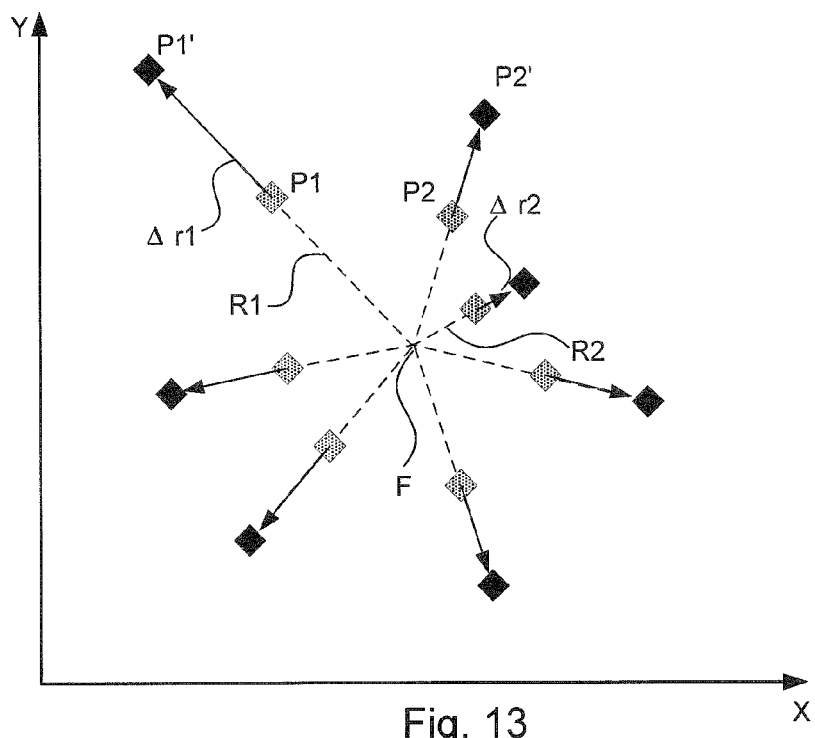
FIG. 13 shows an illustration of a moving object to be tracked in a direction parallel with a line of sight with descriptors having been assigned according to an embodiment of the teachings herein.

FIG. 13 schematically illustrates an example movement of points P1, P2 which correspond to an object (not specifically shown). As can be seen the points have moved from a first position P1, P2 to a second, later position P1', P2'. The length of movement Δr1, Δr2 for each point P1, P2 is proportional to the distance R1, R2 of the object from a focal point F. If the distance R1, R2 increases, it indicates a movement towards the camera and if the distance R1, R2 decreases, it indicates a movement away from the camera. Since the distance R also can be expressed through: $R^2=X^2+Y^2$; where X and Y are the rectangular coordinates or components for each point, the authors of the teachings herein have realized after insightful reasoning that the X and Y-components can be used instead of the radius R even though the origin of the coordinate system does not coincide with the focal point F. This simplifies the calculations that are to be performed greatly.

In one embodiment the controller is configured to determine a mean position for point pairs P1, P1' and P2, P2' belonging to a dataset that has been reduced according to above. This generates an array of mean positions for the point pairs.

Optionally, the controller can be configured to filter out those points that differ too much from a detected total movement determined according to the manner disclosed above. For the example of FIG. 9 the total movement is X=−12; Y=0.

The mean position for $P1_m$ is determined through $P1_m$=(P1+P1')/2

Figure 14:
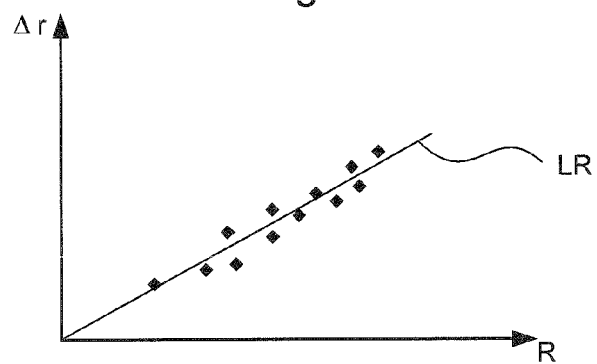
FIG. 14 shows an illustration of a linear fitting of mean positions and relative distances having been determined according to an embodiment of the teachings herein.
Figures 15A, 15B:
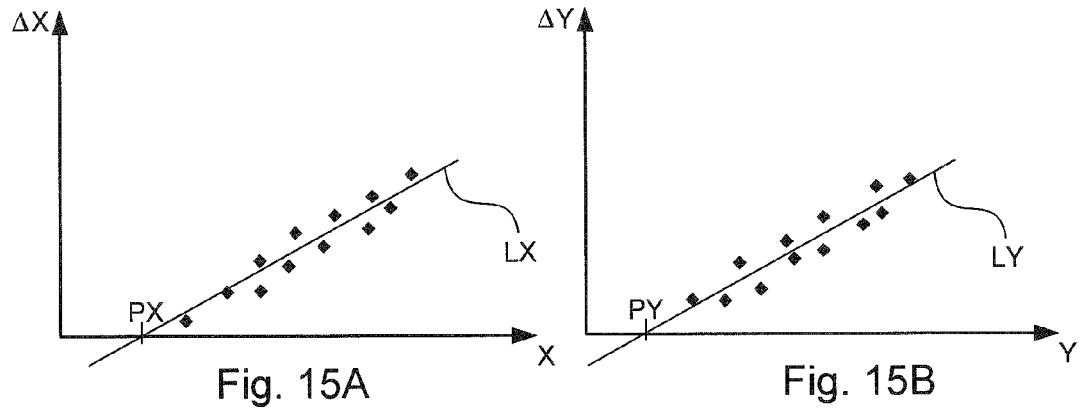
FIGS. 15A and 15B each show an illustration of a linear fitting of mean positions and relative distances having been determined according to an embodiment of the teachings herein based on rectangular coordinates.

The controller is further configured to generate a corresponding array of the relative distances Δr1, Δr2 for the point pairs P1, P1' and P2, P2' and to compare the relative distances Δr1, Δr2 against the mean positions $P1_m$, $P2_m$. FIG. 14 shows a plot of the relative distance Δr versus the distance R to a focal point F and FIGS. 15A and 15B shows the corresponding plots for the X and Y components or coordinates.

The controller is configured to determine a slope of a corresponding line LR, LX and LY by performing a line fitting on the data in the arrays. For the plot in FIG. 14 the resulting line LR can be expressed as: Δr=a+bR, where a is the intercept and b is the slope of the line LR.

The slope b is proportional to the movement in a depth-wise direction of an image and can be used to track an object moving in a depth-wise direction, also called the Z-direction. A positive slope (b>0) indicates movement towards the camera and a negative slope, (b<=) indicates movement away from the camera.

The controller is, in one embodiment, configured to perform such a line fitting to determine a slope based on the X and Y components for the point pairs P1;P1', P2;P2'. FIGS. 15A and 15B show the resulting lines LX and LY for the X and Y components or coordinates and the determined slopes for the lines LX and LY can be used by the controller to determine the movement in the Z-direction. For a movement solely in the Z-direction the slopes for the X and Y components linear fittings LX and LY are the same.

The focal point F can be determined from the line fitting for the X and the Y components. In the graphs of FIGS. 15A and 15B the coordinates for the focal point F can be determined as when the relative distance is zero, i.e. ΔX=0 gives PX and ΔY=0 gives PY, where F=(PX;PY).

The focal point F can be used to identify an object and differentiate it from other objects, as F indicates a centre point for the object. The focal point F can thus be used to identify an object when tracking multiple objects as has been disclosed above with reference to FIGS. 11 and 12.

It should be noted that through an efficient conversion from rectangular coordinates to polar coordinates the distance R and the change in distance Δr can be used to calculate the slope and thereby the movement in the Z-direction.

When tracking multiple objects the plots for the R, X and Y components will display several trends, one trend will be associated with each object, and multiple line fittings will be performed by the controller. The slope for each line fitting corresponds to the movement of the associated object.

FIG. 16 illustrates a general method for tracking an object according to the teachings herein. A dataset comprising point pairs is received 1610. The dataset has preferably been reduced according to the teachings as disclosed above, but the method and manner disclosed herein for determining movement in a z-direction can also be used on datasets generated and reduced in other manners.

The mean positions for the point pairs are determined 1620 as well as the relative distances of the point pairs 1630 and a slope is determined 1640 for example through performing a line fitting of the relative distances versus the mean positions.

The movement in the Z-direction is determined 1650 based on the slope.

The manner of tracking an object in a z-direction according to herein is beneficial in that it requires few computational resources. A further, major benefit is that it does not require a special camera or multiple cameras and can be used in any computing device arranged to receive a dataset for images or an image stream for example from a camera, internal or external.

By combining the methods and manners disclosed above for tracking an object in a vertical and horizontal direction with the teachings of how to track an object in a direction parallel with a line of sight a manner of tracking an object in three dimensions is achieved. Such a combination can be achieved by combining the methods of FIGS. 10 and 16 so that the point pairs received 1610 are the point pairs that remain after the filtration, for example after the filtration 1048 of point pairs that exhibit a too large movement.

To determine and identify a gesture performed by a tracked object such as a hand a controller is configured to determine a movement vector for the tracked object and compare the movement vector against a vector library.

Figure 17:
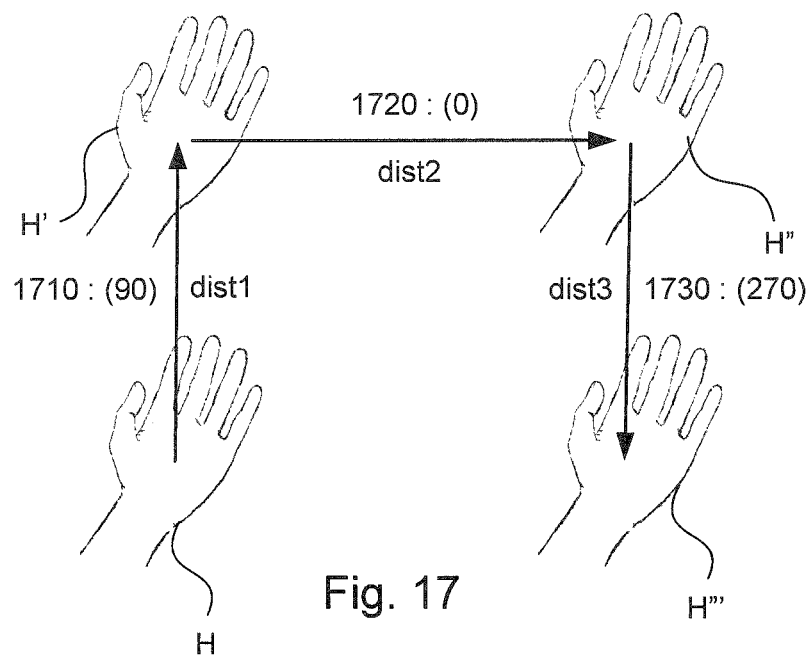
FIG. 17 shows a schematic illustration of an object performing a gesture.

FIG. 17 shows a schematic illustration of a hand H which performs a gesture by being moved in three directions Up, Right and Down. In FIG. 17 the gesture is represented by three partial movements 1710 Up, 1720 Right and 1730 Down. The directions of the partial movements 1710-1730 are indicated in FIG. 17 through their directions (in degrees) being printed in parenthesis for each movement. The movement vector thus comprises at least one partial movement each having a direction. The movement vector for the gesture in FIG. 17 has three components and can be specified by the partial movements' directions, such as {90, 0, 270} the direction being identified by an angle of the direction. To describe a gesture as a series of directions is memory space efficient and also enables a simple and fast comparison to be performed to identify a gesture.

The example in FIG. 17 is given for two dimensions but it should be noted that the concept taught herein with reference to FIGS. 17-23 can easily be expanded to three or further dimensions as will be discussed below.

To allow for user movement inaccuracy, the controller is configured to determine that there is a match if a compared angle is within a range or error tolerance of the angle to be compared with. The angle to be compared to will hereafter be referred to as the reference or library angle. In other words, the controller is configured to determine that there is a match of a partial movement if $$\beta-\phi)<\alpha<\beta+\phi$$

where β is the library angle, α the angle to compare and φ the error tolerance.

To filter out involuntary movements the controller may be configured to, in addition to the angle of a movement, also determine the distance for the movement and only if the distance (dist) is above a threshold value (V1), compare the angle of the movement with the library angle. In other words, if dist>=V1 then the (partial) movement is detected and to be compared.

By combining the measuring of the distance and the error tolerance for the angle the controller is configured to detect a gesture (or part of a gesture) by differentiating it from random movements of the object being tracked. The combination of distance and angle error tolerance defines a cone (with its top cut off) within which cone any resulting movement will be detected as a movement in the direction of the angle.

For the example movement of FIG. 17 there are three partial movements constituting a gesture for the tracked object H. The first movement represents the movement from position H to H' at an angle of 90 degrees and a distance dist1, the second movement represents the movement from position H' to H" at an angle of 0 degrees and a distance dist2 and the third movement represents the movement from position H" to H'" at an angle of 270 degrees and a distance dist3. Only if all distances dist1, dist2 and dist3 are longer than the threshold value V1 and all angles are within an error tolerance will the gesture be recognized. Alternatively a gesture will also be recognized if the sum of the distances is above the threshold value, that is, if dist1+dist2+dist3>=V1 the gesture is identified or recognized.

The object tracking which is disclosed herein, especially with reference to FIGS. 4 to 16 provides real-time coordinates for tracking of an object. This allows for a fast identification of a gesture suitable for use in a real-time system as the coordinates are provided in real-time and the identification of a gesture is performed without extensive or resource demanding computations.

Figure 18:
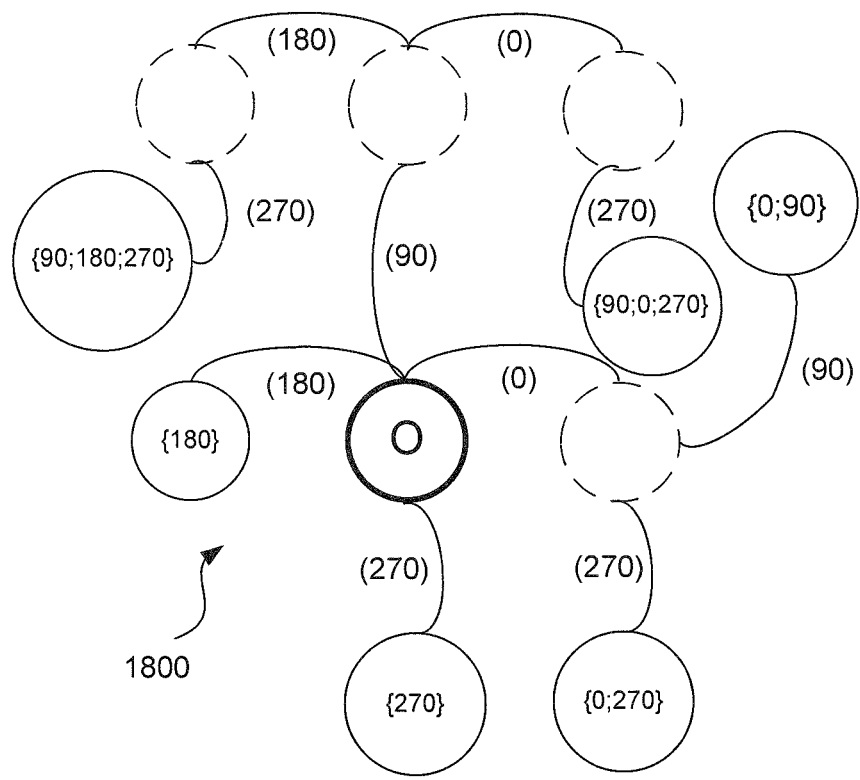
FIG. 18 shows a schematic illustration of a state diagram or Turing machine for identifying gestures according to one embodiment of the teachings herein.

In one embodiment the controller is configured to identify a gesture through the use of a state diagram, such as a Turing machine. FIG. 18 shows an example of such a Turing machine for identifying the example gestures listed in table 1. The Turing machine 1800 (as the Turing machines 1900, 2000, 2200 of FIGS. 19, 20 and 22) is implemented and executed by a computing device such as disclosed with reference to FIGS. 1 and 2.

The controller (not shown in FIG. 18, but referenced 210 in FIG. 2) is determined to start in an initial or start state indicated with bold lines and an O in FIG. 18. As a movement is detected, possibly by determining that a distance of the movement is above a threshold value V1, as has been disclosed above, the angle of the movement initiates a state transition. In the Example of FIG. 18 only four angles are used for movements, the four angles being 0 degrees (movement to the right), 90 degrees (movement up), 180 degrees (movement to the left) and 270 degrees (movement down). It should be clear that also further directions may be applied and used to define and identify gestures according to the teachings of this application.

If a detected movement has an angle that differs less than the error tolerance from an angle identifying a transition, that transition is executed. For example, if a movement to the left is detected (at an angle of 170 degrees), assuming that the error tolerance is 10 degrees, the controller will initiate a transition from the initial state O to another state indicated {180} in FIG. 18. The state {180} corresponds to an action, which is indicated by the state being drawn with full lines. From table 1 the action can be identified to be an Undo action.

As in this example, the gestures and their corresponding actions can be stored in a database or record in the memory (referenced 240 in FIG. 2) of the computing device.

A sequence of movements can be detected and identified through state transitions in the Turing machine 1800 of FIG. 18. For example the series of movements shown in FIG. 17 would result in the state referenced {90;0;270} which, according to table 1, corresponds to the action Zoom in.

If the controller tracks a movement at an angle, say 120 degrees, which falls outside the error tolerance cone for any of the angles (assuming an error tolerance of 10 degrees), the controller will return to the initial state O. In another embodiment (which will be discussed above) the controller will return to the previous stable state, a stable state being a state corresponding to an action or the initial state. In the example of FIG. 17 the previous stable state is the initial state for all other (instable) states.

If the controller is unable to track a movement having a distance of longer than the threshold value, possibly within a time out value T1, and not having reached a (stable) state that corresponds to an action, the controller will return to the initial state O. In FIG. 18 the states corresponding to an action are marked with continuous lines and the states not corresponding to an action are marked with dashed lines. One example value of a timeout threshold T1 is 0.5 seconds. Another example is 0.3 to 1 second.

In one embodiment the object tracking disclosed with reference to FIGS. 4 to 16 may be arranged so that a position for a tracked object is only provided if the object has been moved a distance longer than the distance threshold value. This allows for one controller of the computing device, such as a central processing unit (CPU), to process application data, while another processor, such as a graphics processing unit (GPU), process tracking data.

By configuring a controller to detect and identify a gesture through the use of a Turing machine 1800 enables the identification of a gesture to be done fast, reliably and in real-time without requiring vast computational resources. Furthermore the manner disclosed herein is flexible in that the gestures need not have a specific format and can easily be adapted by adding states in the Turing machine 1800.

This manner is furthermore easy to expand to also include other dimensions, for example depth, rotation, degrees of turning, distance of movement and speed of movement.

Figure 19:
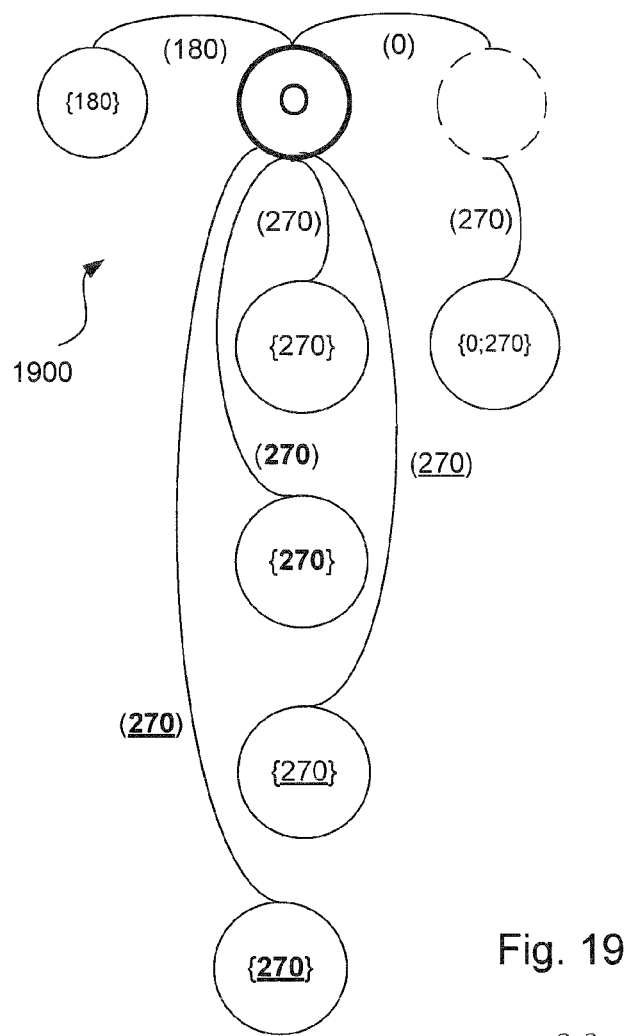
FIG. 19 shows a schematic illustration of a state diagram or Turing machine for identifying gestures according to one embodiment of the teachings herein.

FIG. 19 shows an example of a Turing machine 1900 for identifying gestures in four dimensions, the four dimensions being two spatial dimensions, speed of movement and length of movement. The Turing machine 1900 of FIG. 19 is an expansion of a part of the Turing machine 1800 of FIG. 18. It should be noted that even though the Turing machine 1900 of FIG. 19 is directed at four dimensions, the teachings herein are applicable to any combination of the dimensions.

In the example embodiment of FIG. 19, the Turing machine 1900 and the controller implementing the Turing machine is enabled to differentiate between a fast and a slow movement, i.e. determine the speed of a movement. If the speed of the movement is determined to be above a speed threshold S1 the movement is classified as a fast movement, and if not the movement is classified as slow movement. The speed of the movement can be determined by comparing the distance of the movement with the time taken to cover the distance. This can be determined during the tracking of the object or during the identification of a movement and corresponding gesture. In FIG. 19 a fast movement is indicated by being underlined, such as the transition (270) transiting to the state {270} corresponding to the action Print. One example of a speed threshold value is based on the distance threshold V1 so that S1=V1/1 second. Another example of a speed threshold value is based on the distance threshold V1 and the timeout threshold value T1 so that S1=V1/T1.

The controller may also and/or additionally be configured to differentiate between a long and a short movement. This can be done by comparing the distance (for example dist1 in FIG. 17) of a movement with a second threshold value V2, the second threshold value V2 being larger than the first threshold value V1. If the distance is longer than the second threshold value, the movement is classified as a long movement, and if not the movement is classified as a short movement. In FIG. 18 a long movement is indicated by being in bold font, such as the transition (270) transiting to the state {270} corresponding to the action Delete.

It is thus possible to assign different actions to the same direction by taking into account dimensions such as speed of movement and/or length of movement. For the example of FIG. 19 and table 1 the Turing machine 1900 provides the states and the corresponding actions of {270} short, slow movement downwards corresponding to a Send action, {270} long, slow movement downwards corresponding to a Delete action, {270} short, fast movement downwards corresponding to a Print action, and {270} long, fast movement downwards corresponding to a Delete without confirmation action. This enables assigning actions with severe consequences to gestures that are more distinct, that is decisive or determined in their nature. For example, it is less likely to perform a long movement by mistake than to perform a short movement by mistake.

To enable flexibility according to different users, different computing devices, different cameras and/or different applications and situations, the controller is configured to determine the distance threshold values V1 and/or V2 based on a size of the object to be tracked, a distance to the object to be tracked, size of the display and the field of view of the camera.

The distance to the object to be tracked can be determined through a focus feature of the camera or the depth-wise tracking as disclosed with reference to FIGS. 13 to 15. Using the depth-wise tracking, the threshold values can be increased or decreased according to the object's movement in a depth-wise direction (substantially parallel to the line of sight of the camera).

For example, if the threshold vales V1 and V2 are relative the size of the object to be tracked, some example values of V1 and V2 are V1=3× size of object; V2=6× size of object.

For example, if the threshold vales V1 and V2 are relative the field of view of the camera, some example values of V1 and V2 are V1=20% of field of view; V2=50% of field of view. For a field of view of 120 degrees V1 is 24 degrees and V2=60 degrees.

The gesture detection disclosed herein is suitable for real-time execution as has been discussed above. To enable faster overall execution and operation, the controller of the computing device (referenced 210 and 200 respectively in FIG. 2) is configured to preemptively execute an action corresponding to an assumed gesture as a gesture is being detected. Returning to FIG. 18 the operation of a controller configured to preemptively execute a corresponding action will be disclosed.

In a situation where an upwards movement has been detected (referenced by transition (90) in FIG. 18 only two actions are possible, namely the actions Zoom in (corresponding to {90;0;270}) and Zoom out (corresponding to {90;180;270}). In this example the actions relate to an image being displayed. To prepare, the controller can retrieve image data needed to perform the zoom action, and possibly also determine both a zoomed in and a zoomed out representation of the image being displayed. By preparing for the action to be taken, the action can be executed in a much shorter time, thereby resulting in a faster response time. For example, if the image data needs to be loaded from an external drive, many tenths of a second can be saved by initiating the loading of the image data before the gesture is completed and identified. As is known, a response time of more than 0.1 seconds is experienced as stressing or tedious by many users of computing devices. A computing device arranged to preemptively execute an action is therefore of great benefit in that it reduces the response time and is less stressful to use.

Due to the computational efficiency of modern controllers, such as central processing units (CPU), a controller will be idle for many clock cycles during while the gesture is being performed and detected and since human movement is relatively slow compared to processors the authors of this application have realized that by utilizing these free clock cycles to preemptively execute an action (at least partially) a shorter response time for the action is achieved.

In this example, the controller is able to determine the corresponding gesture even though the gesture has not been completed yet. The controller is aware of which gesture is being input already in the states {90;180} and {90;0} as only one transition leads from each (instable) state. The controller may thus execute the corresponding action preemptively and as the state corresponding to the action is reached the result of the preemptively executed action can be presented or effected. In this example the zoomed (in or out) image is displayed. By holding off on effecting the result of the preemptively executed action, a user is allowed time to regret an action by interrupting the gesture.

This manner of preemptively executing an action is especially beneficial if one controller performs the object tracking and one processor performs action-related operations.

To enable a greater variety of gestures, the authors of this application have realized that a gesture can be allowed to form a subsequence of another gesture.

Figure 20:
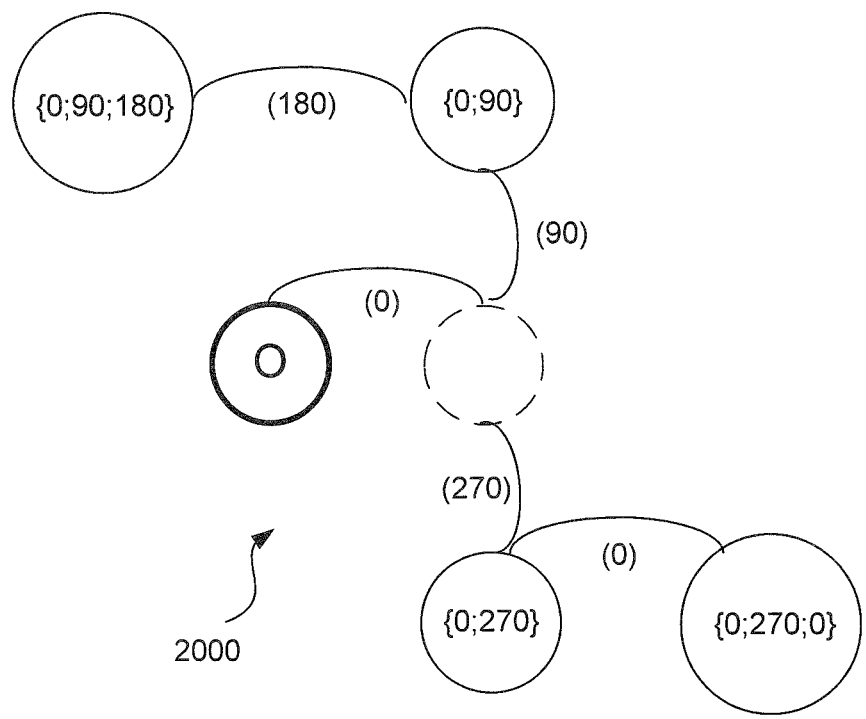
FIG. 20 shows a schematic illustration of a state diagram or Turing machine for identifying gestures according to one embodiment of the teachings herein.

FIG. 20 shows a Turing machine 2000 for a controller enabled to differentiate between a first gesture and a second gesture where the first gesture consists of a subsequence of the second gesture. The Turing machine 2000 is an expansion of a part of the Turing machines 1800 or 1900 of FIG. 18 or 19.

The state referenced {0;90} corresponds to the action Turn page forwards (see table 1) and the state referenced {0;270} corresponds to the action Turn page backwards (see table 1) as in the Turing machine 1800 of FIG. 18. The Turing machine 2000 further includes two states, one state referenced {0;90;180} corresponding to the action Scroll forwards and one state referenced {0;270;0} corresponding to the action Scroll backwards.

As can be seen all four states are stable states and the state referenced {0;90} is on the path to the state referenced {0;90;180} i.e. the gesture for {0;90} is a subgesture of the gesture for {0;90;180} and the state referenced {0;270} is on the path to the state referenced {0;270;0} i.e. the gesture for {0;270} is a subgesture of the gesture for {0;270;0}.

To differentiate between subgestures and full gestures a controller is configured to return to the previous stable state if a further movement is detected having an angle not corresponding to any other gesture. This allows for finishing a gesture by a moving in an undefined direction. This also enables hold gestures.

Alternatively and/or additionally, should no further movement be detected within a time threshold T1, the controller returns to the previous stable state. The previous stable state possibly being the state that is currently visited, if such a state is a stable state.

For the example of FIG. 20 a Turn page forwards action is executed if a user performs the gesture right-up-(down/away/right/stop) and a Scrolling forwards action is executed if a user performs the gesture right-up-left-(down/away/right/stop). Analogously a Turn page backwards action is executed if a user performs the gesture right-down-(down/away/left/stop) and a Scrolling backwards action is executed if a user performs the gesture right-down-right-(down/away/left/stop). The scrolling actions could be defined as a hold gestures so that the scrolling continues while the controller is in a scrolling state (i.e. no further movement is detected).

To allow multiple object gestures, the controller may be configured to track multiple objects as has been disclosed with reference to FIGS. 11 to 12 and also 13 to 15. The movement of each object (referenced O1 and O2 in FIGS. 11 and 12) may be identified through a state diagram or Turing machine as disclosed with reference to FIGS. 18 to 20 where one instance of the Turing machine of each (or a combination of) the Turing machines 1800, 1900, 2000 of FIGS. 18, 19 and 20 is generated and executed for each object. This allows for multiple objects performing simultaneous or concurrent gestures. The gestures identified for each object may be combined into a corresponding action or each gesture may result in each an action. This allows for simultaneous operation or handling using multiple concurrent gestures. One example of a use of such multiple object gestures being controlling a first application or a first player in a gaming application with one hand and controlling a second application or a second player in a gaming application with another hand thereby enabling multithread execution and also enabling multiplayer gaming.

Figure 21:
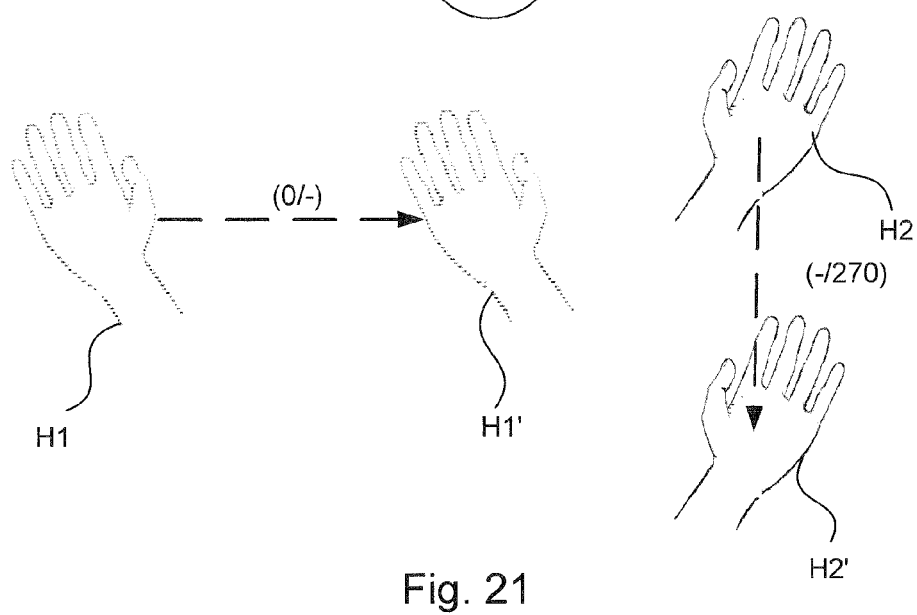
FIG. 21 shows a schematic illustration of two objects performing a gesture.
Figure 22:
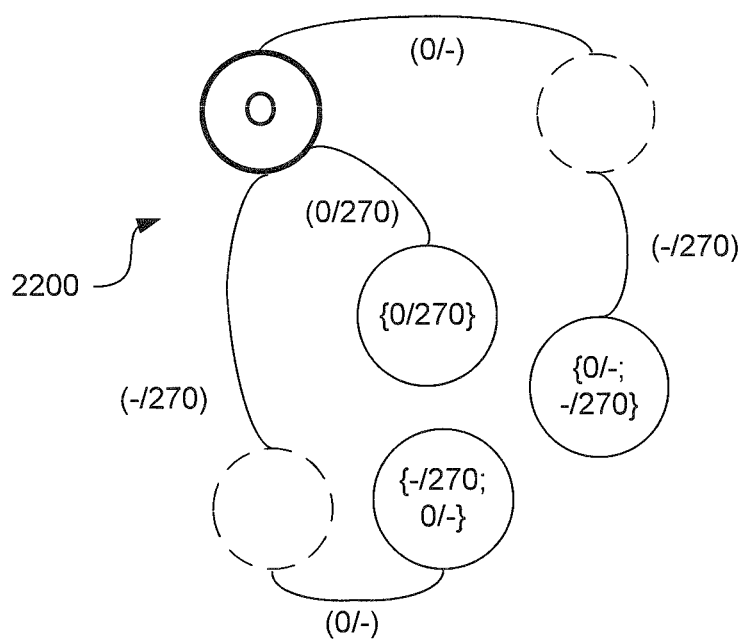
FIG. 22 shows a schematic illustration of a state diagram or Turing machine for identifying gestures according to one embodiment of the teachings herein.

FIG. 22 shows an illustration of a Turing machine 2200 for identifying complex gestures performed by multiple objects. Such gestures may be used for controlling one and the same application thereby providing or enabling a richer gesture library to a developer of the application. FIG. 21 shows a schematic illustration of two objects, in this example two hands H1 and H2, performing a complex, multiple object gesture. The first hand (left hand) H1 makes a movement to the right (referenced (0/–) to indicate that the first object moves in a direction of 0 degrees) to a second position H1' and the second hand (the right hand) H2 makes a movement downwards (referenced (–/270) to indicate that the second object moves in a direction of 270 degrees) to a second position H2'.

The Turing machine 2200 has three states for the complex gesture depending on which hand, the first (left) hand H1 or the second (right) hand H2 moves first. The gestures and the corresponding actions are shown in table 2. The example gestures and the corresponding multiple actions are only for illustrative purposes and it should be clear that the examples in themselves are not to be construed as being limiting to the teachings herein. Each transition in the Turing machine 2200 corresponds to a movement of at least one object.

If the first (left) hand H1 moves first, the controller will end up in a state referenced {0/–;–/270} corresponding to the action of bringing up a next page and deleting it (or the previous). If the second (right) hand H2 moves first, the controller will end up in a state referenced {–/270; 0/–} corresponding to the action of deleting a current page and bringing up a next page. Depending on which page is deleted (the previous or the next) these two actions possibly provide different end results. Alternatively, the order provides the user with a possibility to preview the next page before deleting the previous (state {0/–;–/270}).

If the first hand H1 and the second hand H2 moves substantially simultaneously, a third multiple action is executed. In this example the simultaneous action corresponds to a zooming operation.

In one embodiment the order of which object is detected to be moved in is of no consequence. This reduces the number of available gestures, while it simplifies the input of correct gesture as a user does not need to perform exact timing of the movements.

Having multiple object gestures enables for a richer gesture library and one which is also more flexible to an application designer's needs and desires for the application.

To further simplify the gesture input for a user the controller may be configured to provide user feedback during the gesture identification phase, by displaying an indicator or status (for example through small icons, arrows, text or progress bar in a corner, for example the upper right corner, of the display) of detected movements. The indication is updated each time one direction of motion has been detected successfully. This enables a user to understand the gesture progress. This is especially beneficial for complicated gestures (containing many directions of motions or combinations of movements).

Figure 23:
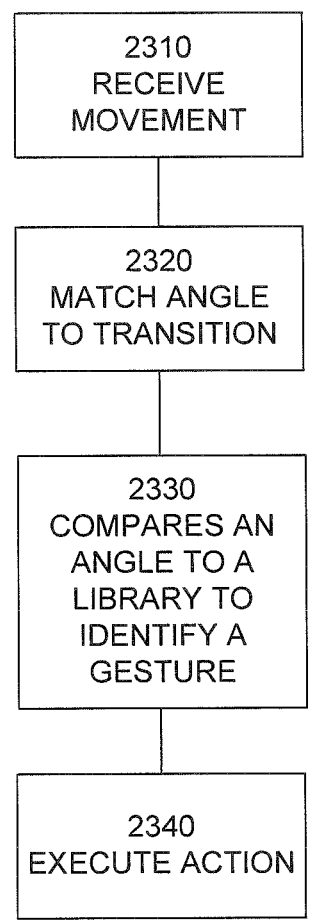
FIG. 23 shows a flowchart illustrating a general method for identifying a gesture according to an embodiment of the teachings herein.

FIG. 23 illustrates a general method for identifying a gesture according to the teachings herein. A computing device receives 2310 data identifying a movement for an object to be tracked, for example through an angle for a direction of movement of the object. The angle is compared 2330 to a reference or library angle for library gestures to determine whether a gesture is identified or not. If so, the computing device executes 2340 a corresponding action.

The angle is compared to the library by traversing a state diagram wherein the angle is part of a sequence of angles and each angle in the sequence is matched 2320 against a transition between two states in the state diagram. If a state is reached that corresponds to an action, the action is executed 2340.

The teachings herein provide the benefit that the simple calculations do not require any vast computational resources to be implemented efficiently. For example, the manner taught does not require any scaling, rotation or deformation operations to be made and the determination of the curvatures is indeed simple and elegant. The manner taught herein is thus suited for use in low or adverse light conditions which also makes it highly suited for portable devices and entertainment systems.

The manner of identifying gestures disclosed herein is beneficial in that as it is based on directions instead of absolute positions it is less sensitive to the distance between the object and camera. There is also no need for scaling a tracked object to fit a library or reference object. This is particularly useful as the same gesture setting may be employed for different devices (such as but not limited to TV, mobile phones and stationary computers).

Furthermore, the gesture library only requires a minimum of data so it is easy to store and fast to manipulate thereby requiring only a minimum of computational resources.

The manner disclosed herein is also able to handle changes in scale in that it interprets a change in scale as a gesture in a direction parallel with a line of sight or it ignores such movements. This provides for a robust manner of identifying gestures.

The teachings herein provide the benefit that the simple operations of comparing an angle and possibly a distance do not require any vast computational resources to be implemented efficiently. For example, the manner taught does not require any scaling, rotation or deformation operations to be made and the determination of the curvatures is indeed simple and elegant. The manner taught herein is thus suited for use in low or adverse light conditions which also makes it highly suited for portable devices and entertainment systems.

Another benefit lies in that no training of the tracking system or the gesture identification is required.

Yet another benefit lies in that the manner taught herein is very easy to integrate in an existing device as the input required is the image stream which can be provided as a video stream from a camera (internal or external) or through another video source, such as a film or streamed video stream. The output provided is the coordinates for the relative movement which, in combination with the input, creates a simple interface to the manner taught herein that is easy to integrate into existing devices as well as into designs for devices to be produced.

The invention has mainly been described above with reference to a few embodiments. However, as is readily appreciated by a person skilled in the art, other embodiments than the ones disclosed above are equally possible within the scope of the invention, as defined by the appended patent claims.

TABLE 1

Gestures and corresponding actions

| Gesture | Action |
|---|---|
| {0, 270} | Action1: Turn page forwards |
| {0, 90} | Action2: Turn page backwards |
| {90, 0, 270} | Action3: Zoom in |
| {90, 180, 270} | Action4: Zoom out |
| {180} | Action5: Undo |
| {270} | Action6: Print |
| {270} | Action7: Send |
| {270} | Action8: Delete |
| {270} | Action9: Delete without confirmation |
| {0; 90; 180} | Action 10: Scroll backwards |
| {0; 270; 0} | Action 11: Scroll forwards |

TABLE 2

Multiple object gestures and corresponding actions

| Gesture | Action |
|---|---|
| {0/—; —/270} | Multiple Action1: Next page + Delete |
| {—/270; 0/—} | Multiple Action2: Delete + Next page |
| {0/270} | Multiple Action3: Zoom in |

The invention claimed is:

1. A computing device for tracking an object in an image stream, said computing device comprising:
a memory; and
a controller, wherein said memory has stored therein instructions that, when loaded and executed on a processor, causes the controller to:
receive an image stream comprising at least a first and a previous image of an object to be tracked;
determine at least one contour line in at least said first image, wherein said contour line comprises a plurality of points;
determine and assign at least one descriptor to each point;
filter out points based on the descriptors;
determine relative distances between each point in said first picture with each point in said previous picture, which points have not been filtered out;
determine a maximum occurrence for the relative distances,
determine a mean position of each point pair;
determine a relative distance for each point pair and determine a slope of a corresponding linear fitting of said relative distances versus said mean positions, and
determine a movement in a direction parallel with a line of sight based on the slope,
wherein the maximum occurrence corresponds to a movement of said object to be tracked.

2. The computing device of claim 1, wherein said instructions further cause the controller to filter out points by filtering out points having descriptors that are non-descript.

3. The computing device of claim 1, wherein said instructions further cause the controller to filter out points by filtering out points exhibiting a large movement, by comparing the descriptors of said first image with corresponding descriptors for points of said previous image.

4. The computing device of claim 3, wherein said instructions further cause the controller to filter out points exhibiting a large movement and to determine the relative distances substantially simultaneously.

5. The computing device of claim 1, wherein said instructions further cause the controller to filter out points belonging to stationary contour lines.

6. The computing device of claim 1, wherein said instructions further cause the controller to filter out points that are unlikely to be part of the object to be tracked.

7. The computing device of claim 1, wherein said instructions further cause the controller to determine and assign one descriptor to a point based on an angle of a normal to the corresponding point.

8. The computing device of claim 1, wherein said instructions further cause the controller to determine and assign one descriptor to a point based on a curvature of the corresponding point, wherein the curvature is before and/or after the corresponding point.

9. The computing device of claim 8, wherein said instructions further cause the controller to determine the curvature based on an angle of the normal of the corresponding point, an angle of the normal of a succeeding adjacent point and/or of the normal of a preceding adjacent point and the distance between points.

10. The computing device of claim 1, wherein said instructions further cause the controller to determine a second maximum occurrence for tracking a second object.

11. A computing device according to claim 1, wherein said computing device is a mobile communications terminal, an internet tablet, a laptop computer or a game console.

12. A computing device for tracking an object in an image stream, said computing device comprising:
a memory; and
a controller, wherein said memory has stored therein instructions that, when loaded and executed on a processor, causes the controller to:
receive a dataset comprising at least one point pair comprising a point in a first picture and a point in a previous picture;
determine a mean position of each point pair;
determine a relative distance for each point pair and determine a slope of a corresponding linear fitting of said relative distances versus said mean positions, and
determine a movement in a direction parallel with a line of sight based on the slope, and determine the focal point for tracking a first object and to determine a second focal point for tracking a second object.

13. The computing device of claim 12, wherein said instructions further cause the controller to determine said mean position, said relative distance and said slope based on rectangular coordinates.

14. The computing device of claim 12, wherein said instructions further cause the controller to determine a focal point based on said linear fitting, said focal point identifying a center position of an object.

15. A method for use in a computing device for tracking an object in an image stream, said method comprising:
   receiving an image stream comprising at least a first and a previous image of an object to be tracked;
   determining, using a processor, at least one contour line in at least said first image, wherein said contour line comprises a plurality of points;
   determining, using a processor, and assign at least one descriptor to each point; filter out points based on the descriptors;
   determining, using a processor, relative distances between each point in said first picture with each point in said previous picture, which points have not been filtered out;
   determining, using a processor, a maximum occurrence for the relative distances;
   determine, using a processor, a mean position of each point pair;
   determine, using a processor, a relative distance for each point pair and determine a slope of a corresponding linear fitting of said relative distances versus said mean positions, and
   determine, using a processor, a movement in a direction parallel with a line of sight based on the slope,
   wherein the maximum occurrence corresponds to a movement of said object to be tracked.

16. A computer readable storage medium encoded with instructions that, when loaded and executed on a processor, causes the method according to claim 15 to be performed.

17. A method for use in a computing device for tracking an object in an image stream, said method comprising:
   receiving a dataset comprising at least one point pair comprising a point in a first picture and a point in a previous picture;
   determining, using a processor, a mean position of each point pair;
   determining, using a processor, a relative distance for each point pair and determine a slope of a corresponding linear fitting of said relative distances versus said mean positions, and
   determining, using a processor, a movement in a direction parallel with a line of sight based on the slope; and
   determine, using a processor, the focal point for tracking a first object and to determine a second focal point for tracking a second object.

18. A computer readable storage medium encoded with instructions that, when loaded and executed on a processor, causes the method according to claim 17 to be performed.

* * * * *